United States Patent
Vergossen

(10) Patent No.: US 10,593,923 B2
(45) Date of Patent: Mar. 17, 2020

(54) METHOD FOR ESTABLISHING ELECTRIC CONTACT BETWEEN AN ENERGY STORAGE CELL AND A CONDUCTOR PLATE STRUCTURE

(71) Applicant: AUDI AG, Ingolstadt (DE)

(72) Inventor: David Vergossen, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/324,077

(22) PCT Filed: Jul. 3, 2015

(86) PCT No.: PCT/EP2015/001351
§ 371 (c)(1),
(2) Date: Jan. 5, 2017

(87) PCT Pub. No.: WO2016/015809
PCT Pub. Date: Feb. 4, 2016

(65) Prior Publication Data
US 2017/0207436 A1    Jul. 20, 2017

(30) Foreign Application Priority Data
Jul. 29, 2014   (DE) .................. 10 2014 011 220

(51) Int. Cl.
*H01M 2/20* (2006.01)
(52) U.S. Cl.
CPC ........ *H01M 2/206* (2013.01); *H01M 2220/20* (2013.01)

(58) Field of Classification Search
CPC ........ H01M 2/20; H01M 2/202; H01M 2/206; H01M 2/0237
See application file for complete search history.

(56) References Cited

U.S. PATENT DOCUMENTS

| 7,671,565 B2 | 3/2010 | Straubel et al. | |
| 2008/0241667 A1* | 10/2008 | Kohn | H01M 2/1016 429/159 |

(Continued)

FOREIGN PATENT DOCUMENTS

| CN | 1497766 A | 5/2004 |
| CN | 101952995 A | 1/2011 |

(Continued)

OTHER PUBLICATIONS

German Office Action dated Apr. 23, 2015 of corresponding application No. DE10 2014 011 220.9; 4 pgs.

(Continued)

*Primary Examiner* — Maria Laios
(74) *Attorney, Agent, or Firm* — Maier & Maier, PLLC

(57) ABSTRACT

A method for establishing an electric contact between an electric energy storage cell and an electrically conductive conductor plate structure, The electric energy storage cell is contacted via at least one electrically conductive conductor wire with the conductor plate structure. At least one electrically conductive conductor wire is connected to create electric contact of the electric energy storage cell with the electrically conductive conductor plate structure at a surface of the electrically conductive conductor plate structure facing an electrically conductive storage cell.

6 Claims, 1 Drawing Sheet

(56) References Cited

U.S. PATENT DOCUMENTS

| | | | | |
|---|---|---|---|---|
| 2009/0208837 A1* | 8/2009 | Lin | ....................... | H01M 6/425 |
| | | | | 429/158 |
| 2011/0159350 A1* | 6/2011 | Ochi | ................... | H01M 2/1077 |
| | | | | 429/159 |
| 2012/0121949 A1* | 5/2012 | Eberhard | .............. | H01M 2/105 |
| | | | | 429/82 |
| 2013/0136958 A1* | 5/2013 | Chuang | ................. | H01M 2/105 |
| | | | | 429/53 |

FOREIGN PATENT DOCUMENTS

| | | |
|---|---|---|
| CN | 202178320 U | 3/2012 |
| JP | 2009170687 A | 7/2009 |
| JP | 2014022085 A | 2/2014 |

OTHER PUBLICATIONS

International Search Report and Opinion dated Sep. 11, 2015 of corresponding application No. PCT/EP2015/001351; 7 pgs.
International Preliminary Report on Pantentability dated Jul. 15, 2016 of corresponding application No. PCT/EP2015/001351; 7 pgs.
Transmittal of Translation of the International Preliminary Report on Patentability dated Feb. 2, 2017, in connection with corresponding International Application No. PCT/EP2015/001351, filed Jul. 3, 2015 (8 pgs.).
Chinese Office Action dated Sep. 3, 2018, in connection with corresponding CN Application No. 201580041142.5 (10 pgs., including English translation).

* cited by examiner

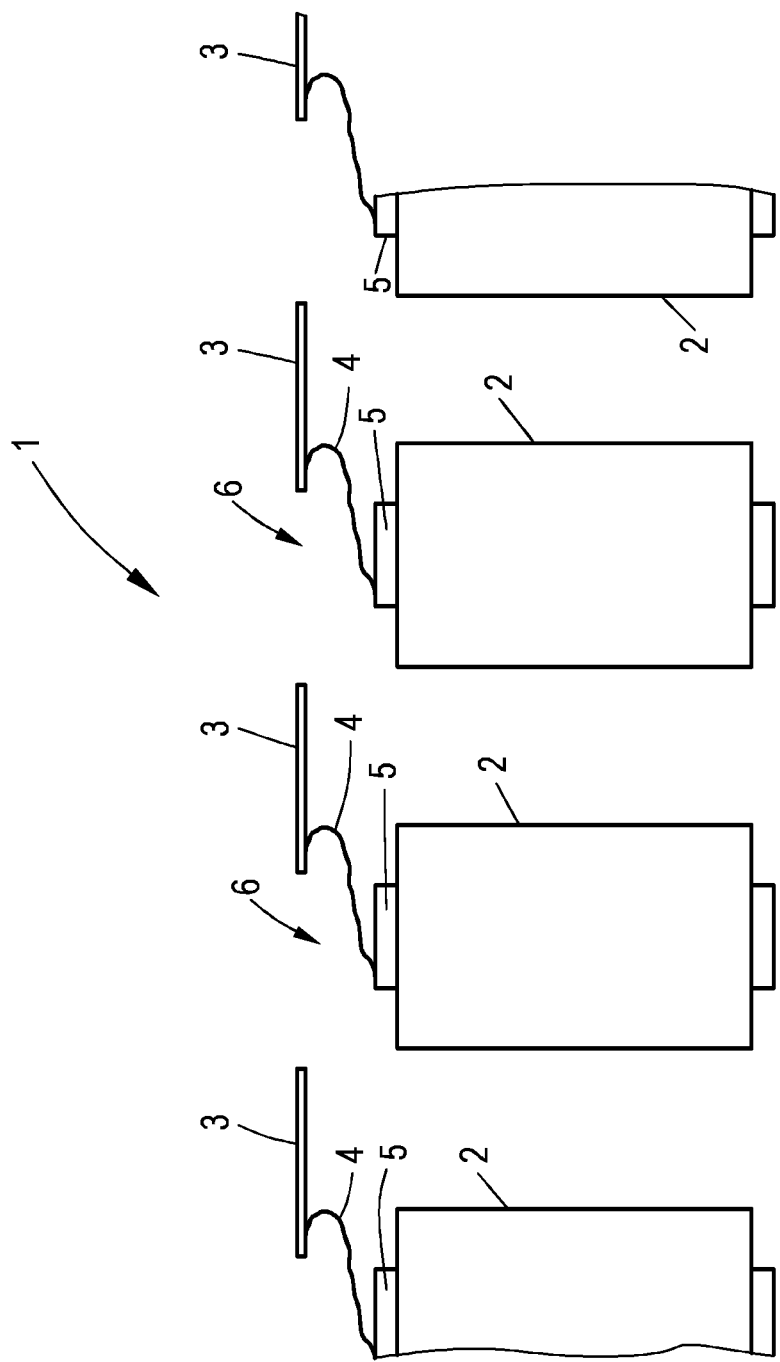

METHOD FOR ESTABLISHING ELECTRIC CONTACT BETWEEN AN ENERGY STORAGE CELL AND A CONDUCTOR PLATE STRUCTURE

BACKGROUND

The invention relates to a method for establishing an electric contact between an electric energy storage cell and an electrically conductive conductor plate structure, wherein the electric energy storage cells are brought into contact with the conductor plate structure through at least one electrically conductor wire.

It is known in connection with the manufacturing of electrical devices consisting of multiple electrically conductive conductor plates that are contacted with electric energy storage cells, i.e. in particular in connection with the manufacturing of energy storage modules containing multiple energy storage cells, that respective electric energy storage cells can be contacted with the conductor plate structure through electrically conductive conductor wires.

According to a known approach, the conductor wires are run through perforations on the side of the conductor plate structure to create a contact on a free upper side of the conductor plate structure.

This approach could be improved from the manufacturing standpoint, in particular based on the fact that the realization of the corresponding conductor wires that are deployed through the perforation on the side of the conductor plate is comparatively expensive.

SUMMARY OF THE DISCLOSURE

The objective of the invention is to provide an improved method for establishing an electric contact between an electric storage cell and an electrically conductive conductor plate structure.

This objective is achieved with a method of the type mentioned in the introduction, which is characterized in that at least one electrically conductive conductor wire is connected to create an electric contact with the electrically conductive conductor plate structure at a surface of the electrically conductive conductor plate structure facing an electric energy storage cell.

The method involves the formation of electrically conductive contacts or connections between at least one electric storage cell and at least one electrically conductive conductor plate structure. The method can be used in particular in connection with the formation of several electric energy storage cells comprised in energy storage device modules, such as for example those that are used to supply electric energy to vehicle-side users built into motor vehicles.

In general, corresponding electrically conductive contacts between such energy storage cells and the or a conductor plate structure are designed according to this method in such a way that the energy storage cells are contacted via at least one electrically conductive conductor wire with the or with a conductor plate structure, i.e. by being electrically attached to them. The conductor plate structure can be also referred to or considered to be a current collecting plate.

The special feature of this method is in that corresponding conductor wires are attached solely to the surfaces of the corresponding conductor plate structure facing directly the respective energy storage cell or cell. The electrical contact of the conductor wires thus takes place exclusively on the surface of the conductor plate structure to be referred to or considered as the underside of the surface facing the respective electric storage cells. The conductor wires are thus not led through the conductor plate structure.

Instead, the conductor wire or wires typically start directly from the energy storage cells and are conducted to the surface of the electrically conductive conductor plate structure that is directly facing the energy storage cell.

The above described approach according to this method is advantageous from the manufacturing standpoint because this makes it possible to avoid expensive realization of corresponding conductor wires through perforations in conductor plates.

The devices required for the realization of the method can be designed relatively inexpensively. Essentially, corresponding devices comprise a tool, which is constructed or configured in such a way so as to contact the corresponding conductor wire with the energy storage cell, and on the other side the surface of the conductor plate structure facing the energy storage cell. The concrete realization of the tool will depend on the concrete type of the connection of the conductor wire to the energy storage cell, as well as on the conductor plate structure.

Within the context of the method, a perforated, electrically conductive plate structure can be used that is formed so that it is provided with several perforations. Even when this type of a conductor plate structure is used, namely one that should be commonly considered as a perforated plate, the procedure is not used in this case to lead the conductor wires through the perforations on the side of the perforated structure. The conductor wires are connected on the side of the conductor plate structure to a surface of the conductor plate structure that is directly facing the respective energy storage cells.

Typically, the or in general a conductor plate structure that is used within the context of this method is provided with a flat or planar form. In particular, the planar type or flat shape of conductor plate structures are thus used. Basically, however, the corresponding conductor plate structure are also provided with curved or arched portions, at least in section.

With respect to the electric connection or contacting of the or in general of a conductor wire to the or in general to an energy storage cell, it is within the context of the method generally advantageous when the conductor wire is connected on the side of the energy storage cell to an electric connection component, in particular a cell pole, which is electrically connected to the energy storage cell. The respective energy storage cell-side electric connection components, i.e. in particular negative or positive cell poles, are thus advantageously used as suitable contacting regions to create a contact of the corresponding conductor wires to the corresponding energy storage cells.

The connection of the or in general of a connector wire to the or in general to an electrically conductive conductor plate structure is advantageously carried out by means of bonding or wire bonding. Basically, all the common bonding or wire bonding methods are applicable. In particular, the connection can be established with all common connection methods, or in general as a connection of conductors to the or in general to a conductor plate structure, for example by means of thermo-compression, thermosonic-ball wedge bonding or ultrasound wedge-wedge-bonding.

It is preferred when the conductor plate structure used here is made of a metal that has good electric conductivity characteristics. The metal, under which term are here of course also understood metal alloys, should be suitable for use during the bonding process. Therefore, aluminum, gold, copper, or conductor wires made of conductor wires manufactured from aluminum, gold or copper, should be in particular considered.

It is preferred when the used conductor plate structure is also made from metals having good conductivity. The metal, under which term are here of course also understood metal alloys, should be suitable within the context of a corresponding bonding process. Particularly suitable for such a consideration are therefore conductor plate structures made of aluminum or copper, or conductor plate structures comprising aluminum or copper. Also this list is used only as an example and not as a comprehensive list.

The conductor plate structure can also consist of several materials having different electric conductivity, which are present in a structure consisting of several layers, or having a multi-layer design. At least those that are directed towards or facing the surfaces of the energy storage cell of the conductor plate structure should be formed from a material or from a metal that has good electric conductivity and that is well suited for use in a corresponding bonding process.

The invention further also relates to an electric arrangement comprising at least one energy storage cell and at least one electrically conductive conductor plate structure, wherein the at least one electric energy storage cell is electrically contacted according to one of the processes described above with the electrically conductive conductor plate structure. Therefore, all the embodiments are applicable in connection with the method analogously also to the electric arrangement. The electric arrangement can be for example an energy storage cell module provided with several energy storage cells that are mutually connected with or connected to each other, which can be for example built into a motor vehicle to provide electric energy for an electricity consumer built into a motor vehicle.

Other advantages, features and details of the invention will become apparent from the embodiments described below based on the attached FIGURE. The single FIGURE shows a schematic representation of an electric arrangement, which is produced according to one of the embodiments of the method.

DETAILED DESCRIPTION OF THE DRAWINGS

The single FIGURE shows a schematic representation of a section of an electric arrangement 1, which is produced according to one of the embodiments of the method of the invention. As can be seen from the FIGURE, the arrangement 1 includes several electric storage cells 2, which are arranged adjacent to each other, based for instance on lithium or on a lithium compound, as well as a conductor plate structure 3.

The energy storage cells 2 are accommodated in an receiving device, not shown in the FIGURE, which serves in particular to ensure the relative position of the energy storage 2 relative to each other, and to protect the energy storage cells 2 from external influences, in particular from mechanical and corrosive influences.

The method is used in general to create in general an electric contact between corresponding energy storage cells 2 and at least one corresponding conductor plate structure 3. According to the method, the energy storage cells 2 are respectively contacted through electrically conductive conductor wires 4 with the conductor plate structure 3. The conductor plate structure 3 is a so called current collecting plate.

The bonding method or the wire bonding method are employed in particular in order to realize an electric contact between respective energy storage cells and the conductor plate structure 3.

An essential fact about the method is that, as shown in the FIG., respective conductor wires are connected to create electric contact with the conductor plate structure 3 on a surface of the conductor plate structure 3 facing respective energy storage cells 2. Respective conductor wires 4 are thus on one side connected or contacted on the respective energy storage cell-side to or with the electric connection components 5 in the form of positive or negative cell poles, and therefore are also led directly from these components to the respective surface of the adjacent conductor plate structure 3 facing the surfaces of the respective energy storage cells 2, to which or with which they are then connected or electrically contacted in the same manner.

The conductor wires 4 employed here are formed from a metal having a good electric conductivity, such as for example aluminum or an aluminum alloy. The metal is suitable for the use in a suitable bonding process.

The conductor plate structure 3 used here is formed from a metal which has good electric conductivity, such as copper or a copper layer. The metal is suitable for use in an appropriate bonding process. The conductor plate structure 3 could consist also of several materials that have different electric conductivity, which are provided in several layers or in a multi-layered construction. However, at least the surface of the conductor plate structure 3 that is turned towards the energy storage cells 2 should be formed from a material or metal that has good electric conductivity and that is suitable for use in the context of a corresponding bonding process.

As one can see from the FIGURE, the conductor plate structure 3 used here is a flat or planar perforated plate and it is provided with an arrangement of several perforations 6, which are typically created in a regularly spaced arrangement.

Although only the (upper) conductor plate structure 3 above the energy storage cells 2 is shown in the FIGURE, it is of course also possible to create a (lower) arrangement of the conductive plate structure 3 below the energy storage cells 2 and to contact the energy storage cells 2 accordingly, alternatively or in addition, with the (lower) conductor plate structure. The electric contact would be thus connected also here in such a way that the conductor wires would be connected for electric contacting of the electric energy storage cells 2 with the electrically conductive conductor plate structure 3 on the surface of the electrically conductive conductor plate structure 3 that is facing the energy storage cell 2.

The invention claimed is:

1. A method for establishing electric contact between at least one electric energy storage cell and an electrically conductive conductor plate structure, comprising:
   contacting the at least one electrical energy storage cell via an electrically conductive conductor wire with the conductor plate structure;
   connecting at least one electrically conductive conductor wire to establish electric contact of the at least one electric energy storage cell with the electrically conductive conductor plate at a surface of the electrically conductive conductor plate structure that is facing the at least one electric energy storage cell, wherein the connection of the electrically conductive conductor wire to the electrically conductive conductor plate structure takes place by means of bonding, wherein the electrically conductive conductor plate structure includes a plurality of layers, wherein the plurality of layers of the electrically conductive conductor plate structure includes a plurality of conductive materials which have different electric conductivity, and wherein the electrically conductive conductor plate structure is formed at least partially with a perforated plate structure having multiple perforations.

2. The method according to claim 1, wherein the electrically conductive conductor wire is led directly to the surface of the electrically conductive conductor plate structure facing the at least one electric energy storage cell.

3. The method according to claim 1, wherein the electrically conductive conductor wire is connected on the side of the at least one electric energy storage cell to an electric connection component.

4. The method according to claim 1, wherein the at least one electrically conductive conductor wire is formed from at least one of aluminum, gold or copper, or comprises aluminum, gold or copper.

5. The method according to claim 1, wherein the conductive conductor plate structure is formed from at least one of aluminum or copper.

6. An electric arrangement, comprising:

at least one electric energy storage cell; and an electrically conductive conductor plate structure, wherein the at least one electric energy storage cell is electrically contacted with the electrically conductive conductor plate structure, wherein at least one electrically conductive conductor wire establishes electric contact of the at least one electric energy storage cell with the electrically conductive conductor plate structure at a surface of the electrically conductive conductor plate structure that is facing the at least one electric energy storage cell, wherein the electrically conductive conductor plate structure includes a plurality of layers, wherein the plurality of layers of the electrically conductive conductor plate structure includes a plurality of conductive materials which have different electric conductivity, and wherein the electrically conductive conductor plate structure is formed at least partially with a perforated plate structure having multiple perforations.

* * * * *